(12) United States Patent
Graves

(10) Patent No.: US 7,510,064 B2
(45) Date of Patent: Mar. 31, 2009

(54) POWER TAKE-OFF HAVING AN AXIALLY MOVABLE BEARING

(75) Inventor: Damon B. Graves, Memphis, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 291 days.

(21) Appl. No.: 11/384,982

(22) Filed: Mar. 20, 2006

(65) Prior Publication Data

US 2007/0215430 A1    Sep. 20, 2007

(51) Int. Cl.
*F16D 11/00* (2006.01)
*F16D 13/60* (2006.01)
*F16D 25/08* (2006.01)

(52) U.S. Cl. ............................. 192/85 CA; 192/110 B
(58) Field of Classification Search ............. 192/85 CA, 192/110 R, 110 B
See application file for complete search history.

(56) References Cited

U.S. PATENT DOCUMENTS

| | | | | |
|---|---|---|---|---|
| 3,444,971 | A | * | 5/1969 | Davidson et al. ......... 192/85 CA |
| 3,800,928 | A | * | 4/1974 | Pray ....................... 192/85 CA |
| 5,913,396 | A | * | 6/1999 | Hein ....................... 192/70.28 |
| 6,142,274 | A | | 11/2000 | Warner |
| 6,151,975 | A | | 11/2000 | Kirkpatrick et al. |
| 6,497,313 | B1 | | 12/2002 | Blalock |
| 6,962,093 | B2 | | 11/2005 | Warner |
| 7,007,565 | B2 | | 3/2006 | Allen et al. |
| 2007/0034476 | A1 | * | 2/2007 | Braford .................... 192/87.11 |

FOREIGN PATENT DOCUMENTS

| | | |
|---|---|---|
| EP | 1 045 161 | 10/2000 |
| EP | 1 108 912 | 6/2001 |
| WO | WO98/39575 | 9/1998 |

OTHER PUBLICATIONS

Translation of EP 1108912.*

* cited by examiner

*Primary Examiner*—Tisha D Lewis
(74) *Attorney, Agent, or Firm*—MacMillan, Sobanski & Todd, LLC

(57) ABSTRACT

A power take-off includes an axially movable bearing that facilitates the assembly of the power take-off without the use of shims or other axial adjustment devices. The power take-off includes a housing, an input mechanism that is supported for rotation on the housing, and an output mechanism that is supported for rotation on the housing. A clutch assembly is provided that is operable in either a disengaged mode, wherein the input mechanism is not connected to rotatably drive the output mechanism, and an engaged mode, wherein the input mechanism is connected to rotatably drive the output mechanism. An actuating mechanism is provided for selectively operating the clutch assembly in the engaged and disengaged modes. The actuating mechanism including a bearing assembly that is supported on the input mechanism and is axially movable to selectively operate the clutch assembly in the engaged and disengaged modes.

12 Claims, 2 Drawing Sheets

POWER TAKE-OFF HAVING AN AXIALLY MOVABLE BEARING

BACKGROUND OF THE INVENTION

This invention relates in general to power take-offs for selectively driving a driven accessory from a source of rotational power, such as an engine or transmission in a vehicle. More specifically, this invention relates to an improved structure for a such power take-off that includes an axially movable bearing that facilitates the assembly of the power take-off without the use of shims or other axial adjustment devices.

Power take-offs are well known mechanical devices that are commonly used in conjunction with sources of rotational energy, such as vehicular engines and engine-driven transmissions, for selectively providing power to one or more rotatably driven accessories. For example, power take-offs are commonly used in a variety of industrial and agricultural vehicles for operating hydraulic pumps that, in turn, operate hydraulically driven accessories, such as plows, trash compactors, lifting mechanisms, winches, and the like. The power take-off is designed to provide a relatively simple and inexpensive mechanism for supplying rotational power from the source of rotational energy to operate the rotatably driven accessory.

To accomplish this, a typical power take-off includes an input mechanism that is adapted to be connected to the source of rotational energy. The input mechanism is usually embodied as a splined shaft or a toothed gear that is adapted to cooperate with a correspondingly splined or toothed portion contained within the source of rotational energy. Thus, the input mechanism is rotatably driven whenever the source of rotational energy is operated. The power take-off also includes an output mechanism that is adapted to be connected to the rotatably driven accessory. The output mechanism is usually embodied as a splined or keyed shaft that is adapted to cooperate with a correspondingly splined or keyed portion contained within the rotatably driven accessory. In some instances, the input mechanism is directly connected to the output mechanism such that the rotatably driven accessory is always rotatably driven whenever the source of rotational power is operated. In other instances, the input mechanism is connected to the output mechanism through a clutch assembly such that the rotatably driven accessory is selectively rotatably driven only whenever the source of rotational power is operated and the clutch assembly is engaged.

The various components of a typical power take-off, including the input mechanism, the clutch assembly, and the output mechanism described above, are usually supported within a protective housing. To facilitate the assembly of these various components, the housing of the power take-off is often provided in two parts, namely, a main housing portion and a bearing cap. The main housing portion is generally hollow and cylindrical in shape, having a closed end and an opened end. The bearing cap is sized and shaped to be connected to the main housing portion so as to close the opened end and protectively enclose the components of the power take-off contained therein. To assemble the power take-off, the various components of the power take-off described above are initially inserted through the opened end of the main housing portion and assembled therein. Following such assembly, the bearing cap is secured to the main housing portion to close the opened end thereof and provide a sealed enclosure for the various components of the power take-off.

Often, portions of the input mechanism and the output mechanism (such as the ends of the input and output shafts) are supported for rotation on portions of the power take-off housing. For example, the ends of the output shaft of a conventional power take-off are often rotatably supported in a pair of bearings that are respectively disposed within openings formed through the opened end of the main housing portion and through the bearing cap, and many of the components of the power take-off are supported on that output shaft. Although this general structure has been effective, it has been found that manufacturing tolerance variations in the shapes of both the main housing portion and the bearing cap can result in undesirable variations in the axial distance that separates the openings in which the bearings are respectively supported. In some instances, these axial distance variations can result in undesirable axial looseness between the two bearings and the components of the power take-off that are supported on the output shaft. When this occurs, it is known to provide one or more annular shims on the output shaft to take up such axial looseness. In other instances, these axial distance variations can result in undesirable axial compression of the two bearings by the components of the power take-off that are supported on the output shaft. When this occurs, it is known to provide one or more annular shims between the main housing portion and the bearing cap of the housing of the power take-off to relieve such axial compression. However, the use of such shims can add undesirable cost and labor time to the assembly of the power take-off. Thus, it would be desirable to provide an improved structure for a power take-off that obviates the need for such shims.

SUMMARY OF THE INVENTION

This invention relates to an improved structure for a power take-off that includes an axially movable bearing that facilitates the assembly of the power take-off without the use of shims or other axial adjustment devices. The power take-off includes a housing, an input mechanism that is supported for rotation on the housing, and an output mechanism that is supported for rotation on the housing. A clutch assembly is provided that is operable in either a disengaged mode, wherein the input mechanism is not connected to rotatably drive the output mechanism, and an engaged mode, wherein the input mechanism is connected to rotatably drive the output mechanism. An actuating mechanism is provided for selectively operating the clutch assembly in the engaged and disengaged modes. The actuating mechanism including a bearing assembly that is supported on the input mechanism and is axially movable to selectively operate the clutch assembly in the engaged and disengaged modes.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
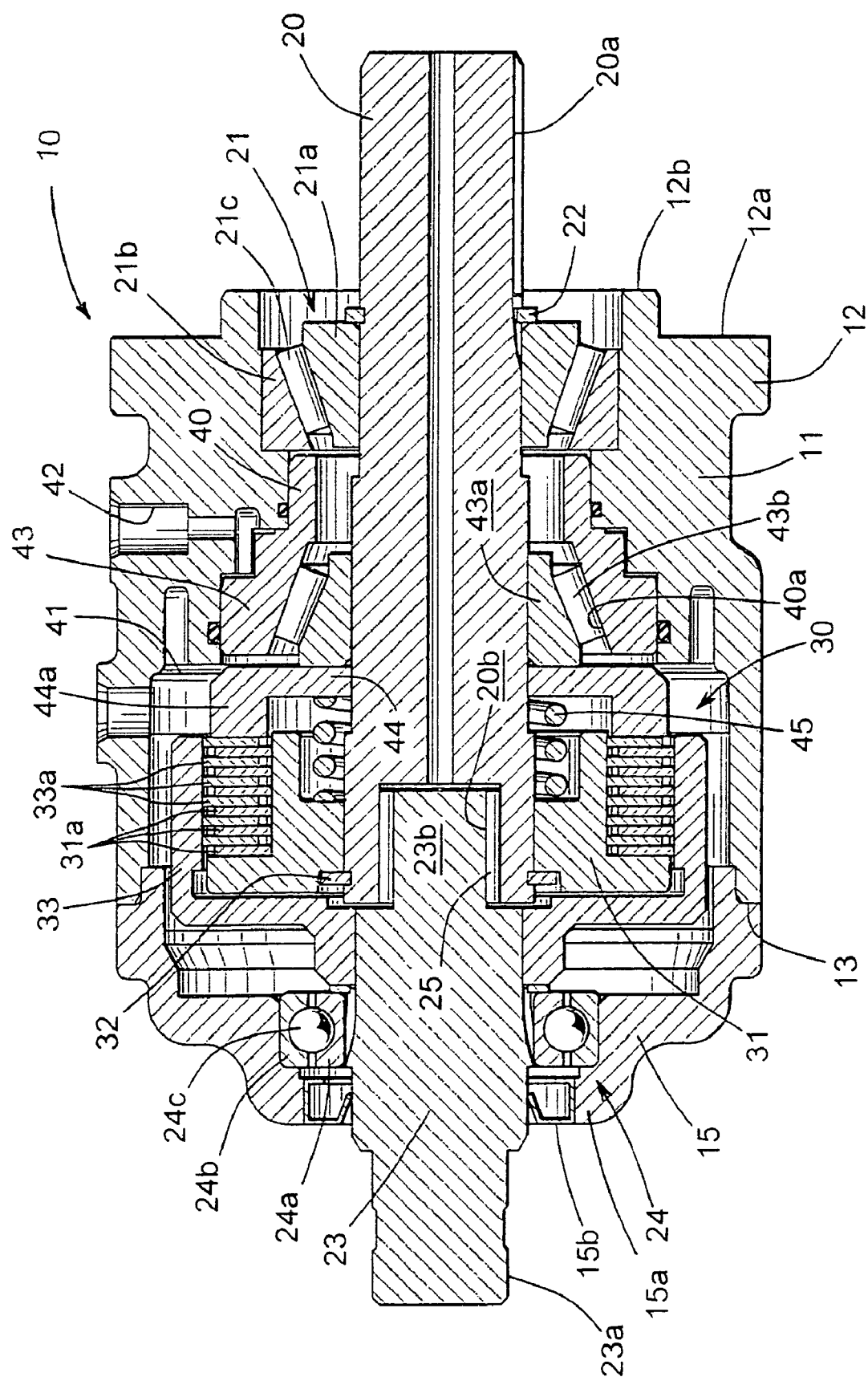
FIG. 1 is a sectional elevational view of a power take-off in accordance with this invention including a clutch assembly that is shown in a disengaged condition.
Figure 2:
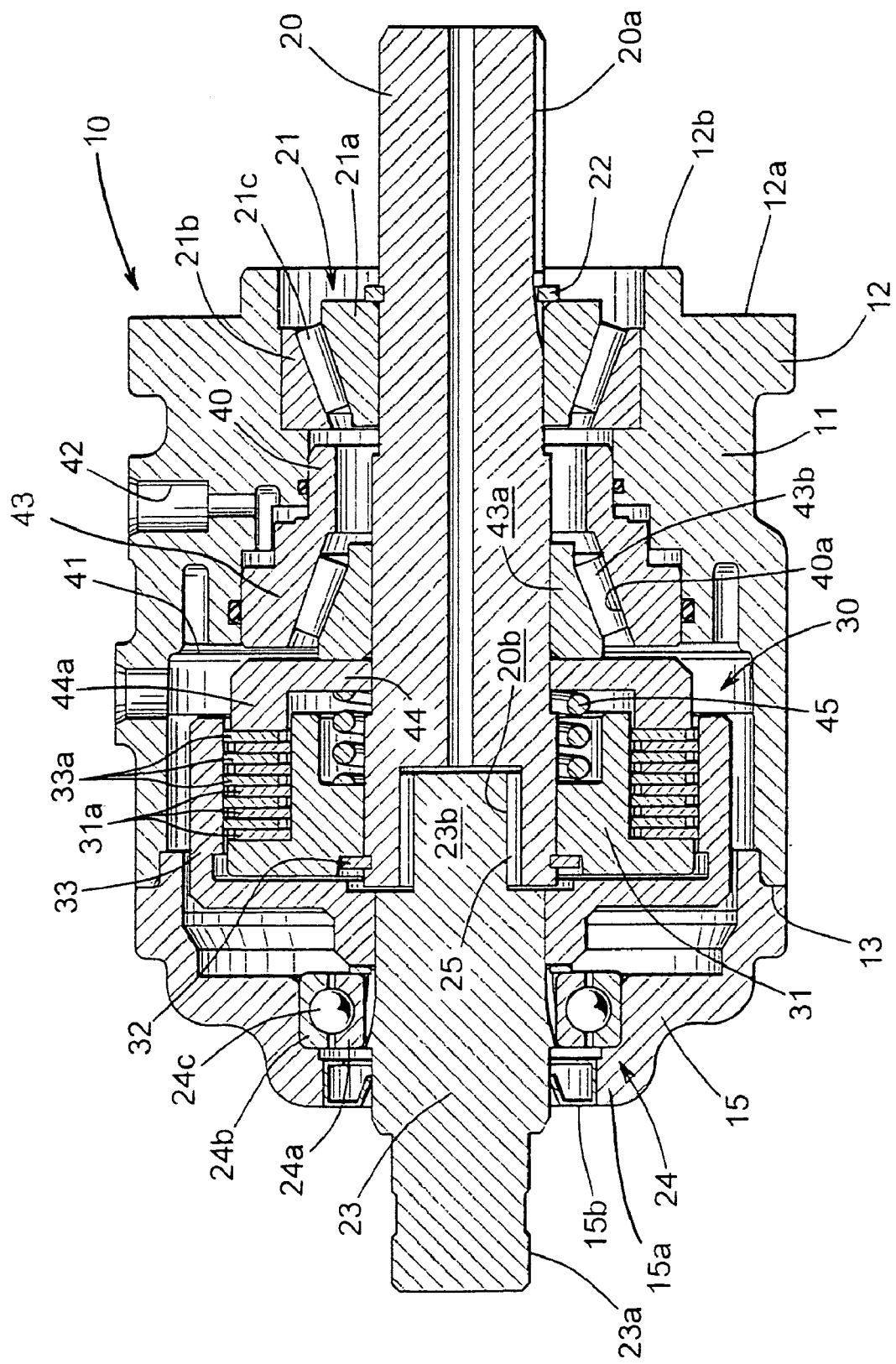
FIG. 2 is a sectional elevational view of the power take-off illustrated in FIG. 1, wherein the clutch assembly is shown in an engaged condition.

Referring now to the drawings, there is illustrated in FIGS. 1 and 2 a portion of a power take-off, indicated generally at 10, in accordance with this invention. The illustrated power take-off 10 is intended to be representative of any structure for selectively driving a driven accessory (not shown) from a source of rotational power (not shown). Thus, the scope of this invention is not intended to be limited for use with the specific structure for the power take-off 10 illustrated in FIGS. 1 and 2 or with power take-offs in general. On the contrary, as will become apparent below, this invention may be used in any desired environment for the purposes described below.

The illustrated power take-off 10 includes a main housing portion 11 that, as shown in the drawings, is generally hollow and cylindrical in shape. The main housing portion 11 includes a closed end 12 (the right end when viewing the drawings) and an opened end 13 (the left end when viewing the drawings). The closed end 12 of the main housing portion 11 has a mounting surface 12a provided thereon, and a hollow cylindrical protrusion 12b extends axially from the mounting surface 12a. The mounting surface 12a and the protrusion 12b are provided to facilitate the attachment of the power take-off 10 to a source of rotational power (not shown) in the manner described below.

The illustrated power take-off 10 also includes a bearing cap 15 that is connected to the opened end 13 of the main housing portion 11 so as to close such opened end 11 and protectively enclose the components of the power take-off 10 that will be described in detail below. To accomplish this, the bearing cap 15 has an axially extending protrusion 15a provided thereon. The protrusion 15a is sized and shaped to be received within and supported on the opened end 13 of the main housing portion 11 such that the bearing cap 15 is supported in a predetermined position relative to the main housing portion 11, as shown in FIGS. 1 and 2. The bearing cap 15 can be retained on the main housing portion 11 by a plurality of threaded fasteners (not shown) or any other conventional means. If desired, a seal (not shown) can be provided between engaging surfaces of the bearing cap 15 and the main housing portion 11 to prevent dirt, water, and other contaminants from entering into the power take-off 10.

The power take-off 10 includes an input mechanism that is adapted to be connected to the source of rotational energy. In the illustrated embodiment, the input mechanism is embodied as an input shaft 20 having a splined end portion 20a that is adapted to cooperate with a correspondingly splined portion contained within the source of rotational energy. However, the input mechanism may be embodied as a toothed gear or any other conventional structure that is adapted to cooperate with a corresponding portion contained within the source of rotational energy. The input shaft 20 is supported for rotation within the power take-off 10 by a first bearing assembly, indicated generally at 21, that is supported within the main housing portion 11. The illustrated first bearing assembly 21 is a conventional tapered roller bearing assembly that includes an inner race 21a that engages the input shaft 20, an outer race 21b that engages the main housing portion 11, and a plurality of bearings 21c that are disposed between the inner race 21a and the outer race 21b. However, the first bearing assembly 21 may be embodied as any conventional bearing structure. The first bearing assembly 21 thus, supports the input shaft 20 for rotation within and relative to the main housing portion 11 of the power take-off 10. The first bearing assembly 21 may be restrained from axial movement in a first direction (toward the right when viewing FIGS. 1 and 2) by a retaining ring 22 or other conventional structure that may be mounted on the input shaft 20, for a purpose which will be explained below.

The power take-off 10 also includes an output mechanism that is adapted to be connected to the driven accessory. In the illustrated embodiment, the input mechanism is embodied as an output shaft 23 having a keyed end portion 23a that is adapted to cooperate with a correspondingly keyed portion contained within the driven accessory. However, the output mechanism may be embodied as a splined shaft or any other conventional structure that is adapted to cooperate with a corresponding portion contained within the driven accessory. The output shaft 23 is supported for rotation within the power take-off 10 by a second bearing assembly, indicated generally at 24, that is supported within the bearing cap 15. The illustrated second bearing assembly 24 is a conventional roller bearing assembly that includes an inner race 24a that engages the output shaft 23, an outer race 24b that engages the bearing cap 15, and a plurality of bearings 24c that are disposed between the inner race 24a and the outer race 24b. However, the second bearing assembly 24 may be embodied as any conventional bearing structure. The second bearing assembly 24 thus supports the output shaft 23 for rotation within and relative to the bearing cap 15 of the power take-off 10. A conventional annular seal 15b may be provided between the bearing cap 15 and the output shaft 23 to prevent dirt, water, and other contaminants from entering into the power take-off 10.

In the illustrated embodiment, the input shaft 20 and the output shaft 23 are co-axially journaled on one another for relative rotational movement. To accomplish this, the input shaft 20 has an axially extending counterbore 20b formed in an end thereof. A plurality of needle bearings 25 or other conventional bearing structure is provided within the counterbore 20b. The output shaft 23 has an axially extending journal 23b formed in an end thereof. As shown in FIGS. 1 and 2, the journal 23b of the output shaft 23 is received within the counterbore 20b of the input shaft 20 and is rotatably supported therein by the plurality of needle bearings 25. Thus, the input shaft 20 and the output shaft 23 are co-axially journaled on one another for relative rotational movement.

A clutch assembly, indicated generally at 30, is provided for selectively connecting the input shaft 20 to the output shaft 23 for concurrent rotation. The clutch assembly 30 includes an input member 31 that is splined or otherwise connected to the input shaft 20 for rotation therewith. A first plurality of flat, annular clutch plates 31a may be splined or otherwise connected to the input member 31 for rotation therewith. Thus, the input shaft 20, the input member 31, and the first plurality of clutch plates 31a all rotate as a unit. The input member 31 may be restrained from axial movement in a second direction (toward the left when viewing FIGS. 1 and 2) by a retaining ring 32 or other conventional structure that may be mounted on the input shaft 20, for a purpose which will be explained below. The clutch assembly 30 also includes an output member 33 that is splined or otherwise connected to the output shaft 23 for rotation therewith. A second plurality of flat, annular clutch plates 33a may be splined or otherwise connected to the output member 33 for rotation therewith. Thus, the output shaft 23, the output member 33, and the second plurality of clutch plates 33a all rotate as a unit. Preferably, the second plurality of clutch plates 33a are interleaved in an alternating manner with the first plurality of clutch plates 31a to form a conventional clutch pack, although such is not required.

The clutch assembly 30 further includes an actuating mechanism for selectively operating the clutch assembly in either a disengaged mode, wherein the input shaft 20 is not connected to rotatably drive the output shaft 23, and an engaged mode, wherein the input shaft 20 is connected to rotatably drive the output shaft 23. The actuating mechanism includes an actuating piston 40 that is supported in a chamber 41 provided within the main housing portion 11 of the power take-off 10. The actuating piston 40 is supported for axial movement between a disengaged position (toward the right, as shown in FIG. 1) and an engaged position (toward the left, as shown in FIG. 2). The actuating piston 40 has a tapered surface 40a that is provided thereon for a purpose that will be explained below. A fluid port 42 is formed through the main housing portion 11 and communicates with the chamber 41. As will be explained in greater detail below, pressurized fluid can be selectively provided from a source (not shown) through the fluid port 42 to the chamber 41 to move the actuating piston 40 from the disengaged position to the engaged position.

The actuating mechanism for the clutch assembly 30 also includes a third bearing assembly, indicated generally at 43, that is supported within the main housing portion 11. The illustrated third bearing assembly 43 is a conventional tapered roller bearing assembly that includes an inner race 43a that engages the input shaft 20 and a plurality of bearings 43b that are disposed between the inner race 43a and the tapered surface 40a of the actuating piston 40, which functions as the outer race of the third bearing assembly 43. However, the third bearing assembly 43 may be embodied as any conventional bearing structure. The third bearing assembly 43 is supported on the input shaft 20 for axial movement relative thereto with the actuating piston 40, as will be explained in greater detail below.

The actuating mechanism for the clutch assembly 30 further includes a clutch piston 44 that is also supported on the input shaft 20 for axial movement relative thereto with the third bearing assembly 43 and the actuating piston 40, as will be explained in greater detail below. The illustrated clutch piston 44 is generally annular in shape and includes a radially outermost flange portion 44a that is axially aligned with the first and second pluralities of clutch plates 31a and 33a. A biasing mechanism is provided for urging the clutch piston 44 (as well as the third bearing assembly 43 and the actuating piston 40) axially toward the disengaged position. In the illustrated embodiment, this biasing mechanism is a coiled spring 45 that is disposed about the input shaft 30. In the illustrated embodiment, the coiled spring 45 reacts between the input member 31 provided on the input shaft 30 and the clutch piston 44 to urge the clutch piston 44 axially toward the disengaged position.

The installation and operation of the power take-off 10 will now be described. Initially, the power take-off 10 is installed on the source of rotational power. To accomplish this, the mounting surface 12a and the protrusion 12b are provided on the closed end 12 of the main housing portion 11, as discussed above. The source of rotational power typically has a correspondingly shaped mounting surface having an opening formed therethrough. Thus, to install the power take-off 10 on the source of rotational power, the mounting surface 12a of the main housing portion 11 is moved into engagement with the mounting surface provided on the source of rotational power. At the same time, the protrusion 12b of the main housing portion 11 is received within the opening formed through the mounting surface of the source of rotational power. A plurality of bolts (not shown) or other conventional retaining structures can be used to secure the power take-off 10 to the source of rotational power in a conventional manner. When so installed, the splined end portion 20a of the input shaft 20 cooperates with a correspondingly splined portion contained within the source of rotational energy. Thus, whenever the source of rotational power is operated, the input shaft 20, the input member 31, and the first plurality of clutch plates 31a are all rotated as a unit. Thereafter, the rotatably driven accessory can be installed on or connected to the output shaft 23 of the power take-off 10, also in any conventional manner.

Initially, as shown in FIG. 1, the power take-off 10 is in the disengaged mode. This occurs because of the urging of the coiled spring 45 which, as discussed above, urges the clutch piston 44, the third bearing assembly 43, and the actuating piston 40 axially toward the disengaged position (toward the right in FIG. 1). Because of this, the first and second pluralities of clutch plates 31a and 33a do not frictionally engage one another. As a result, no rotational power is transmitted through the clutch assembly 30, and the input shaft 20 is not connected to rotatably drive the output shaft 23 when the source of rotational power is operated.

Thereafter, to engage the clutch assembly 30, pressurized fluid is provided from the source through the fluid port 42 to the chamber 41. The pressurized fluid, which can be supplied from a conventional selectively controlled source of pressurized fluid (not shown), is supplied to the chamber 41 and exerts a force against the actuating piston 40 that is slidably disposed therein, thus urging the actuating piston 40 axially toward the engaged position (toward the left in FIG. 1). The force that is exerted by the pressurized fluid in the chamber 41 on the actuating piston 40 is opposite in axial direction to the force that is exerted by the coiled spring 45 on the actuating piston 40. Accordingly, when the magnitude of the force that is exerted by the pressurized fluid in the chamber 41 on the actuating piston 40 exceeds the magnitude of the force that is exerted by the coiled spring 45 on the actuating piston 40, then the actuating piston 40 will move axially from the disengaged position illustrated in FIG. 1 to the engaged position illustrated in FIG. 2. As mentioned above, the actuating piston 40 engages the third bearing assembly 43, and the third bearing assembly 43 engages the clutch piston 44. Accordingly, the axial movement of the actuating piston 40 from the disengaged position to the engaged position also causes the third bearing assembly 43 and the clutch piston 44 to move axially from the disengaged position to the engaged position, as also shown in FIG. 2.

As a result, the outer flange portion 44a of the clutch piston 44 axially engages and compresses the first and second pluralities of clutch plates 31a and 33a against the input member 31 (which, as discussed above, is restrained from axial movement by the snap ring 32). When the first and second pluralities of clutch plates 31a and 33a are compressed in this manner, they frictionally engage one another such that relative rotational movement therebetween is prevented. Consequently, the output member 33 and the output shaft 23 are rotatably driven by the input shaft 20. The clutch assembly 30 will remain in this engaged condition until the magnitude of the force that is exerted by the pressurized fluid in the chamber 41 on the actuating piston 40 drops below the magnitude of the force that is exerted by the coiled spring 45 on the actuating piston 40. At that time, the actuating piston 40 will move axially from the engaged position illustrated in FIG. 2 back to the disengaged position illustrated in FIG. 1 under the urging of the coiled spring 45.

The spring 45 does not contact, and is therefore mechanically isolated from, the clutch 30. During assembly of a power take-off according to the prior art, shims can be required between portions of the housing and/or between components along the drive train to accommodate tolerance stack-ups. Such tolerance stack-ups can result in sloppiness or looseness between parts (negative tolerance stack-up) or can result in undesirable pressing loads acting on components (positive tolerance stack-up). The exemplary embodiment of the invention overcomes these problems by mechanically isolating the biasing device, in the form of the spring 45, from the clutch assembly 30. For example, the biasing device can take-up sloppiness in the event of a negative tolerance stack-up but will not exert a pressing load on the clutch assembly 30 in the event of a positive tolerance stack-up.

Thus, it can be seen that the third bearing assembly 43 is axially movable along the input shaft 20 during operation of the power take-off 10 between the engaged and disengaged modes. The third bearing assembly 43 is essentially self adjusting in nature, being optimally positioned on the input shaft 20 during all stages of operation of the power take-off unit 10. This structure eliminates the need for shims either on the input shaft 20 or between the bearing cap 15 and the main housing portion 11, as has been needed in the past.

In accordance with the provisions of the patent statutes, the principle and mode of operation of this invention have been explained and illustrated in its various embodiments. However, it must be understood that this invention may be practiced otherwise than as specifically explained and illustrated without departing from its spirit or scope.

What is claimed is:

1. A power take-off comprising:
   a housing;
   an input mechanism supported for rotation on said housing;
   an output mechanism supported for rotation on said housing;
   a clutch assembly that is operable in either a disengaged mode, wherein said input mechanism is not connected to rotatably drive said output mechanism, and an engaged mode, wherein said input mechanism is connected to rotatably drive said output mechanism;
   an actuating mechanism for selectively operating said clutch assembly in said engaged and disengaged modes, said actuating mechanism including a bearing assembly that is supported on said input mechanism and is axially movable to selectively operate said clutch assembly in said engaged and disengaged modes;
   wherein said actuating mechanism includes an actuating piston that is supported on said housing and is axial movable with said bearing assembly to selectively operate said clutch assembly in said engaged and disengaged modes;
   wherein said bearing assembly includes an inner race that engages said input mechanism and a plurality of bearings disposed between said inner race and said actuating piston; and
   wherein said actuating piston has a tapered surface, and wherein said plurality of bearings is disposed between said inner race and said tapered surface of said actuating piston.

2. The power take-off defined in claim 1 wherein said input mechanism is an input shaft, and wherein said output mechanism is an output shaft.

3. The power take-off defined in claim 2 wherein said input shaft and said output shaft are co-axially journaled on one another.

4. The power take-off defined in claim 1 wherein said clutch mechanism includes a first plurality of clutch plates that are connected to said input mechanism for rotation therewith and a second plurality of clutch plates that are connected to said output mechanism for rotation therewith.

5. The power take-off defined in claim 1 wherein said bearing assembly is a tapered bearing assembly.

6. The power take-off defined in claim 1 wherein said actuating mechanism further includes a clutch piston that is supported on said input mechanism and is movable with said bearing assembly and said actuating piston to selectively operate said clutch assembly in said engaged and disengaged modes.

7. A power take-off comprising:
   a housing;
   an input mechanism supported for rotation on said housing;
   an output mechanism supported for rotation on said housing;
   a clutch assembly that is operable in either a disengaged mode, wherein said input mechanism is not connected to rotatably drive said output mechanism, and an engaged mode, wherein said input mechanism is connected to rotatably drive said output mechanism;
   an actuating mechanism for selectively operating said clutch assembly in said engaged and disengaged modes, said actuating mechanism including a bearing assembly that is supported on said input mechanism and is axially movable to selectively operate said clutch assembly in said engaged and disengaged modes;
   a biasing mechanism for urging said actuating mechanism axially so as to operate said clutch assembly in said disengaged mode, wherein said biasing mechanism does not exert a pressing load on said clutch assembly in the event of a positive clearance.

8. A power take-off comprising:
   a main housing portion extending between a substantially closed end and an opened end;
   a bearing cap engaging said closed end and cooperating with said main housing portion to define a substantially enclosed interior cavity;
   an input mechanism extending into said interior cavity and supported for rotation by one of said main housing portion and said bearing cap;
   an output mechanism extending into said interior cavity and supported for rotation by the other of said main housing portion and said bearing cap;
   a clutch disposed in said interior cavity and operable to selectively couple said input mechanism and said output mechanism together for concurrent rotation; and
   an actuating mechanism disposed in said interior cavity and operable to selectively engage said clutch to couple said input mechanism and said output together, said actuating mechanism including a piston operable to move within said interior cavity to press against said clutch, a bearing assembly supporting said piston and slidably moveable on one of said input mechanism and said output mechanism, and a biasing device operably disposed between said bearing assembly and said one of said input mechanism and said output mechanism such that said biasing device does not exert a pressing load on said clutch assembly in the event of a positive clearance.

9. The power take-off of claim 8 wherein said clutch and said biasing device are concentric and radially spaced from one another relative to a longitudinal axis of said interior cavity.

10. The power take-off of claim 9 wherein said clutch is positioned radially outward of said biasing device.

11. The power take-off of claim 8 wherein said piston defines a frusto-conical radially inner surface and wherein said bearing assembly is further defined as a tapered bearing assembly received in said frusto-conical radially inner surface.

12. A power take-off comprising:
    a main housing portion extending between a substantially closed end and an opened end;

a bearing cap operable to engage said closed end and cooperating with said main housing portion to define a substantially enclosed interior cavity;

an input mechanism extending into said interior cavity and supported for rotation by said main housing portion, said input mechanism including an input shaft and an input member fixed together for rotation;

an output mechanism extending into said interior cavity and supported for rotation by said bearing cap, said output mechanism including an output shaft and an output member fixed together for rotation, said input mechanism and said output mechanism co-axially journaled on one another;

a clutch disposed in said interior cavity and operable to selectively couple said input mechanism and said output together for concurrent rotation, said clutch having a first plurality of clutch plates fixed to said input member for rotation and a second plurality of clutch plates fixed to said output member for rotation; and an actuating mechanism disposed in said interior cavity and operable to selectively engage said clutch to couple said input mechanism and said output together, said actuating mechanism including a piston operable to move within said interior cavity to press said first and second plurality of clutch plates together and against one of said input and output members, a bearing assembly supporting said piston and slidably moveable on one of said input mechanism and said output mechanism, and a biasing device operably disposed between said bearing assembly and said one of said input member and said output member such that said biasing device does not exert a pressing load on said clutch assembly in the event of a positive clearance.

* * * * *